J. F. METTEN.
SAFETY DEVICE FOR LUBRICATING SYSTEMS.
APPLICATION FILED SEPT. 20, 1918.
1,321,935.
Patented Nov. 18, 1919.
2 SHEETS—SHEET 1.
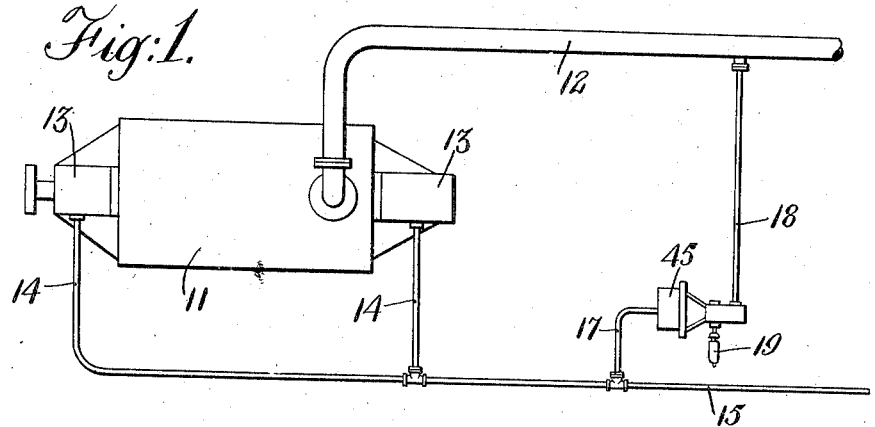
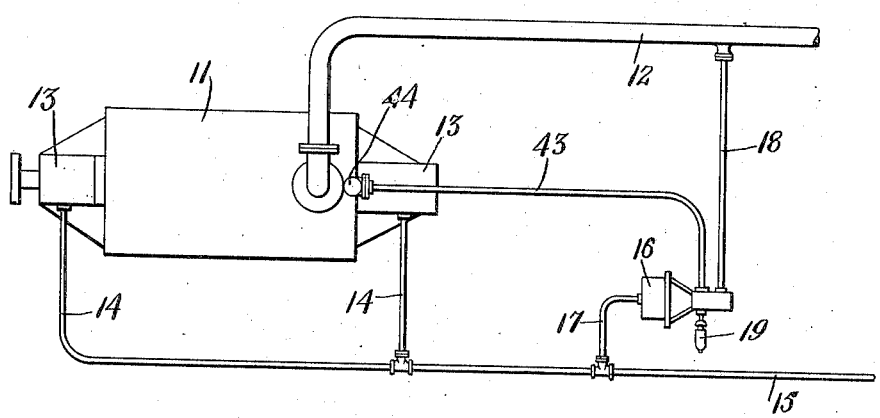
John F. Metten Inventor
By his Attorneys
Edwards, Sager & Richmond.

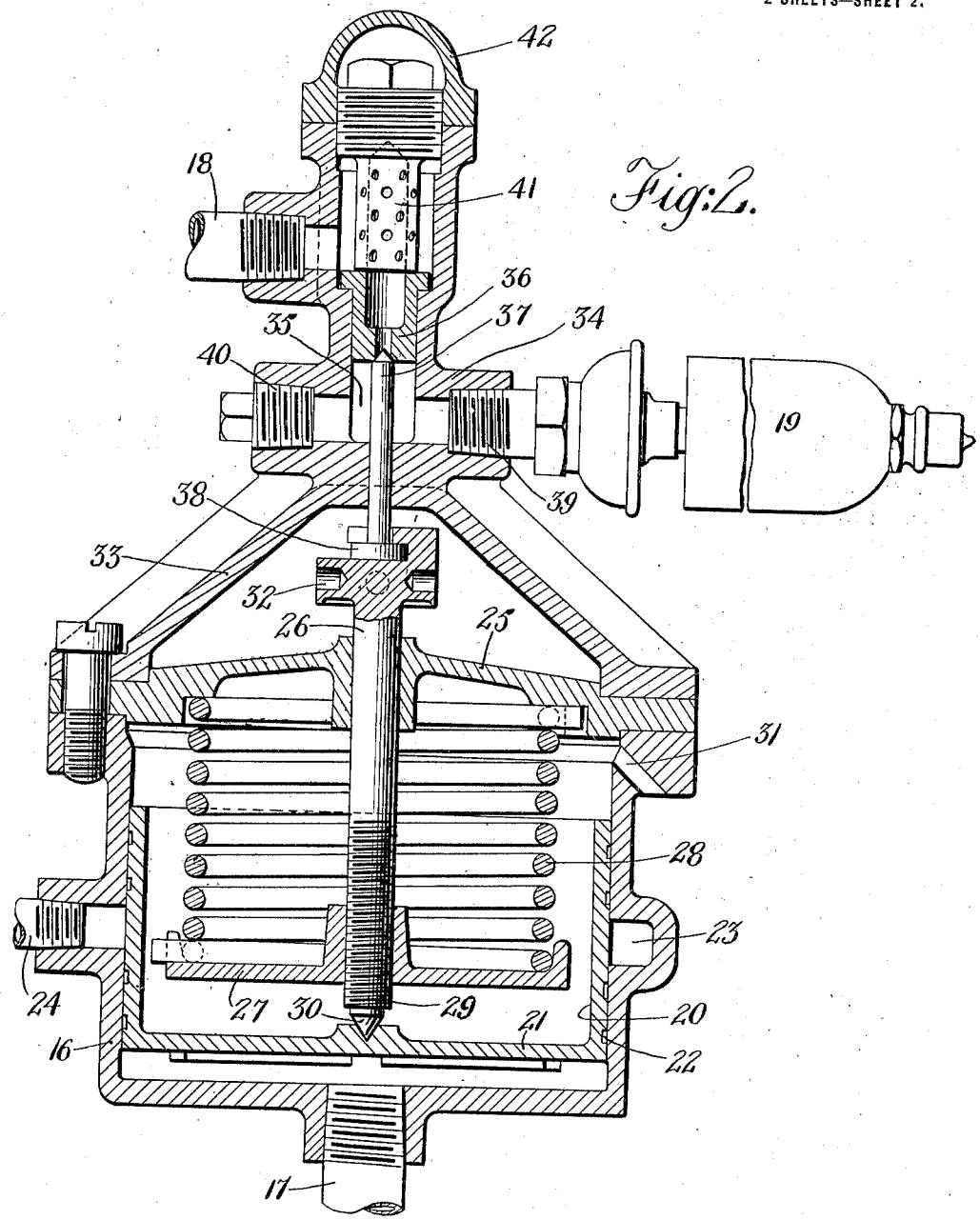

UNITED STATES PATENT OFFICE.

JOHN F. METTEN, OF PHILADELPHIA, PENNSYLVANIA, ASSIGNOR TO THE WILLIAM CRAMP & SONS SHIP & ENGINE BUILDING COMPANY, A CORPORATION OF PENNSYLVANIA.

SAFETY DEVICE FOR LUBRICATING SYSTEMS.

1,321,935. Specification of Letters Patent. Patented Nov. 18, 1919.

Application filed September 20, 1918. Serial No. 254,934.

*To all whom it may concern:*

Be it known that I, JOHN F. METTEN, a citizen of the United States, residing at Philadelphia, in the county of Philadelphia and State of Pennsylvania, have invented certain new and useful Improvements in Safety Devices for Lubricating Systems, of which the following is a specification.

The principal object of my invention is to provide a new and improved device to safeguard against any failure of the pressure in the oil supply for a forced lubricating system. Another object of my invention is to provide means to give an alarm or stop the machine or otherwise promote safety measures upon the failure of the oil supply to such machine. Other objects of my invention have to do with provision of suitable adjustment in such a device, constructing the same in a simple and rugged manner and making it efficient and certain in character of service. All these objects and others will become evident in connection with the following specification and drawings and appended claims. In these drawings I have shown a limited number of specific embodiments of the invention, but it will be understood that modifications can be made within its scope.

Figure 1 is a diagram showing a steam driven turbine with forced lubrication equipped in accordance with my invention;

Fig. 2 is an axial section of an improved automatic device forming part of my invention, and Fig. 3 is a diagram, showing the system adapted to cause an automatic stop as well as to give an alarm.

The steam turbine 11 is driven by steam supplied through the conduit 12. Its shaft bearings 13 are supplied by oil under pressure from the pipe 15 through the branches 14. I provide an automatic device designated generally as 45 which is shown in detail in Fig. 2. It receives the oil pressure through the branch pipe 17 and is supplied with live steam through the branch pipe 18 and comprises a whistle 19 to be actuated as will be described presently.

Referring to Fig. 2, the casing 16 contains the piston 20 with the head 21 and the grooves 22 to reduce the leakage to a minimum. The casing 16 has an annular groove 23 to receive oil that may leak past the piston wall to that extent and drain it off through the pipe 24.

The cylindrical casing 16 has a cap 25 through which passes the piston rod or stem 26 screw-threaded at 29 to engage an adjustable seat 27 for the compression spring 28 lying between it and the head 25. The stem 26 engages the piston 20 at the pointed end 30 and it may be rotated to adjust the spring seat 27 by engaging a wrench with the end 32. A vent 31 equalizes the atmospheric pressure within the cylinder 16 above the piston 21.

Resting on the cap 25 is a spider 33 carrying a valve casing 34 within which is the chamber 35 containing the valve seat 36 closed by the valve 37 which has its head 38 engaging the end of the stem 26 in a manner to permit rotation of said stem 26 without rotating the valve stem 37. The nipple 39 connects the whistle 19 with the valve chamber 35 and another opening to said chamber 35 is closed by the plug 40. The valve seat 36 is held in place by the steam strainer 41 and the cap 42. The branch steam pipe 18 leads through the strainer 41 to the valve seat 36.

When the turbine is in operation, steam under pressure will be flowing along the conduit 12 to the turbine and oil under pressure will be flowing along the pipe 15 to the bearings 13. The pressure to which this oil is subjected will be communicated to the entire head 21 of the piston 20 and will overcome the pressure of the spring 28 sufficiently to hold the valve 37 closed against its seat 36. The cross-section of the steam passage in the valve seat 36 is so small that the steam pressure on the valve 37 will be negligible compared with the oil pressure on the piston head 21. Thus, under normal operation, the valve 37 will be maintained closed.

But if, for any reason, the oil pressure should fail as if the oil pump should break down or the oil supply conduit break open, then the resultant reduction of pressure on the piston head 21 will permit the spring 28 to open the valve 37 and admit steam to the whistle 19 giving an alarm.

It will be observed that the head 32 of the stem 26 can easily be engaged by a wrench or spanner between the legs of the spider 33 so as to adjust the seat 27 and thus adjust the critical spring pressure. In this way adjustment can be secured so that, if desired, the valve 37 will open on a slight reduction of oil pressure in the oil supply pipe 15.

In Fig. 3, I have shown the same equipment as in Fig. 1 with the addition of a pipe 43 connected to the valve chamber 35 by removal of the nipple 40 and leading thence to a trip valve 44 for closing the main steam supply conduit to the turbine. In this case a failure of pressure in the oil conduit will open the valve 37 and sound the whistle 19 and, in addition, admit steam into chamber 35 through pipe 43 to the trip valve 44 actuating the latter to close the steam supply conduit 12 and stop the turbine.

Heretofore ordinary pressure gages have been employed on the delivery side of the oil pump to indicate whether the pump was working properly and maintaining the proper pressure. Sometimes there might be a failure without immediate notice by the attendant of the indication on the pressure gage and serious damage would be done by the failure to supply the oil to the machine bearings. By my invention a positive alarm signal is given that would attract the attention of the attendant and, if desired, an automatic stop is provided.

I claim:—

1. In combination, a steam driven motor having bearings to be lubricated, a conduit to supply oil thereto under pressure, a member subjected to the pressure of the oil in said conduit, a spring opposing such pressure and adapted to move the member upon failure of the pressure, a safety device adapted to be actuated by steam pressure, a branch conduit thereto from the source supplying the motor, and a valve controlling said branch conduit actuated by said member.

2. In combination, a steam driven motor having bearings to be lubricated, a conduit to supply live steam thereto, a trip valve controlling said conduit, a branch conduit from the steam supply conduit to the trip valve to actuate the latter, a valve controlling said branch conduit, a conduit to supply oil under pressure to the motor bearings, a member subjected to the pressure of the oil in said last mentioned conduit, means to exert an opposing force on said member and move the same upon the failure of said pressure, and a connection for said member with said valve in the branch steam conduit.

3. In combination, a machine having bearings to be lubricated, a conduit to supply oil thereto under pressure, a member subjected to the pressure of the oil in said conduit, means to exert an opposing force on said member and move the same upon failure of said pressure, a whistle, a conduit to convey elastic fluid to said whistle, and a valve actuated by said member controlling said last mentioned conduit.

4. In combination, a steam driven motor having bearings to be lubricated, a steam conduit to the motor, a pressure oil supply conduit to the bearings, and a safety device connected by branches with said steam conduit and said oil conduit, said safety device comprising a valve controlling the steam branch, a member connected with said valve and responsive to variation of pressure in the oil branch, and a safety member to be actuated by the steam when the valve controlling the steam branch is open.

5. In a safety device for a forced feed lubricating system, a cylinder supplied by a branch conduit for oil under pressure from the lubricating system, a piston in said cylinder, an adjustable spring acting on said piston against the oil pressure, a valve held against its seat by the piston when the oil pressure overcomes the spring, a conduit to said valve for a motive fluid, and a safety device adapted to have motive fluid admitted by said valve and be actuated thereby.

6. In a safety device for a forced feed lubricating system, a cylinder supplied by a branch conduit for oil under pressure from the lubricating system, a piston in said cylinder, a piston rod through the cylinder head opposite the branch oil conduit rotatably connected with said piston, a spring seat having screw-threaded engagement with said piston rod within the cylinder, a spring between said seat and the cylinder head, means to engage said piston rod externally to said cylinder and rotate it to adjust said spring seat and thereby adjust the tension of said spring, and safety means connected to said piston rod to be actuated by the movement of said piston.

7. In a safety device for a forced feed lubricating system, a cylinder supplied by a branch conduit for oil under pressure from the lubricating system, a piston in said cylinder, a spring within said cylinder acting on said piston against the pressure of the oil, a piston rod, means to adjust the tension of said spring by the rotation of said piston rod, and a safety device connected with said piston rod to be actuated by the movement of said piston.

8. In a safety device for a forced feed lubricating system, a cylinder supplied by a branch conduit for oil under pressure from the lubricating system, a piston in said cylinder, a spider attached to one cylinder head, a valve casing carried by said spider, a valve therein, a piston rod connected to said valve, a safety device, and a motive fluid conduit thereto controlled by said valve.

9. In a safety device for a forced feed lubricating system, a device to be actuated by fluid pressure, a conduit for motive fluid thereto, a valve to control said conduit, a removable valve seat, a strainer for the motive fluid holding said valve seat in position, a conduit for oil under pressure to said bearings, a branch thereto, and means responsive to pressure variation in said branch to actuate said valve.

10. In a safety device for a forced feed lubricating system, a cylinder supplied by a branch conduit for oil under pressure from the lubricating system, a pressure responsive member in said cylinder, a rod therefrom through one cylinder head, a spider on the same cylinder head, safety mechanism carried by the spider connected to be actuated by said rod, means to adjust the degree of response of said member by rotation of said rod, and means to engage the rod within the spider to rotate it.

11. In a safety device for a forced feed lubricating system, a cylinder supplied by a branch conduit for oil under pressure from the lubricating system, a pressure responsive member in said cylinder, a rod therefrom through one cylinder head, a spider on the same cylinder head, a valve carried by the spider with a valve stem connected to said rod, means to adjust the degree of response of said member by rotation of said rod, and means to engage the rod within the spider to rotate it.

JOHN F. METTEN.